Patented May 13, 1941

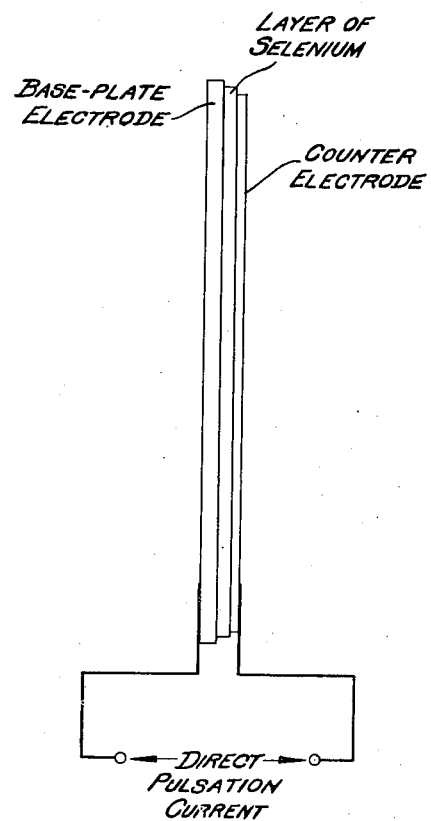

2,241,908

UNITED STATES PATENT OFFICE 2,241,908

RECTIFIER DEVICE

Heinrich Herrmann, Nuremberg, Germany, assignor to Süddeutsche Apparate-Fabrik G. m. b. H., Nuremberg, Germany, a company Application May 31, 1939, Serial No. 276,652
In Germany June 7, 1938

3 Claims. (Cl. 175—366)

This invention relates to rectifier devices, and more specifically to methods of electrically forming dry rectifiers.

In an example of practice, a physically assembled dry rectifier cell or valve of the stack type having an intermediate semi-conductor layer, such as selenium, coated on one of the major surfaces of a base plate electrode and subsequently converted into its grey crystalline state in one or more heat treatments before the counterelectrode has been applied thereto by spraying, must be treated in an electric formation process in order to impart the desired electrical properties to such cell or valve. The blocking layer formed between the semi-conductor layer and the sprayed layer of metal is substantially improved in response to such electric formation process, during the course of which the back current becomes decreased and the disruptive strength of the blocking layer is increased.

Two different methods of carrying out the aforementioned electric formation process are heretofore known in the art, that is, either the use of an alternating current or a direct current. However, both of these methods encounter certain difficulties which will hereinafter be fully substantiated.

With reference to the first mentioned method of employing an alternating current for effecting formation, a current restricting resistance must be provided between the alternating current source and the electrode plates of the rectifier cell or cells because of the fact that the voltage of one half-wave of this current is always applied in the passing direction of the cell. It is thus obvious that alternating current formation causes considerable power losses which may amount to rather high values when a larger number of rectifier cells or valves are concurrently subjected to formation. The power dissipation in the aforementioned resistance is a pure loss which is enhanced by the power consumption in the passing direction of the rectifier cell or cells, and causes an increase in the temperature thereof. In addition, the alternating current formation introduces a substantial loss of time since the alternating formation voltage is effective in the passing direction of the cell only during half the time of the formation, bearing in mind that this procedure in fact requires at least several hours.

The above mentioned losses may be avoided by employing the other of the heretofore mentioned known methods, that is, direct current formation, according to which an initial direct voltage of approximately 10 volts is applied across the electrodes of a dry rectifier subject to formation. This voltage corresponds to a given formation current which gradually decreases with the progressive formation of the blocking layer until a predetermined value is reached, whereupon the formation voltage is raised to again restore the current to its original value. In cases that the formation voltage during the course of this proceeding would reach a value of approximately 16 volts, ionization by collision will take place at the blocking layer in response to the high voltage load which amounts to several hundred thousand volts per centimeter due to the extremely low thickness thereof. Such ionization would cause a considerable increase of current followed by a destruction of the rectifier cell or cells due to the resulting sudden temperature rise. Precautions must therefore be taken that the formation voltage applied to a selenium rectifier does not exceed 15 volts as the maximum value.

It is in fact highly desirable not only from a technical but also from an economical point of view to use blocking voltages of more than 15 volts for carrying out the electric formation of dry rectifier cells or valves. This requirement is satisfied in accordance with my present invention according to which the electric formation is effected by means of a direct pulsation current.

All advantages involved by the above mentioned method of direct battery current formation are utilized when the formation is carried out by means of a pulsating direct current, while each and every disadvantage introduced by the heretofore known methods is reliably avoided. The ionization by collision set up at the voltage critical for a direct current cannot occur due to the fact that an ionic recombination takes place between the individual half-waves of the pulsating direct current. It is thus possible without any difficulties to increase the formation voltage to an arithmetic mean value of 20 volts, for example.

The frequency of the direct pulsation current used during the formation process must be adjusted to any suitable value between 20 and 300 cycles per second in order to protect the blocking layer against a voltage load of excessive duration during one half-wave and to secure sufficient intervals of time for the recombination of the ions between the individual half-waves since either of these two precautions neglected would allow ionization by collision to be set up.

My novel method of direct pulsation current formation is by no means restricted to selenium rectifiers, particularly referred to in the foregoing, but is applicable to all types of devices requiring a formation process.

The accompanying drawing for the sake of distinctness illustrates a conventional dry rectifier device with its two electrode plates connected to a source of a direct pulsation current.

What is claimed is:

1. In a process of manufacturing dry rectifiers which comprises the step of an electric formation, the method of effecting this step by a direct pulsation voltage, the maximum value of said voltage exceeding the direct current breakdown potential of said rectifiers and the interval between pulses being equal to the ionic re-combination time of the ions produced in said rectifier by the pulsating voltage applied thereto.

2. In a process of manufacturing dry rectifiers which comprises the step of an electric formation, the method of effecting this step by a direct pulsation voltage pulsating at a frequency of not less than 20 cycles per second and not higher than 300 cycles per second, the maximum value of said voltage exceeding the direct current breakdown potential of said rectifiers and the interval between pulses being equal to the ionic re-combination time of the ions produced in said rectifier by the pulsating voltage applied thereto.

3. In a process of manufacturing a selenium rectifier which comprises the step of an electric formation, the method of effecting this step by a direct pulsation voltage, the arithmetic mean value of said voltage being equal to 20 volts.

HEINRICH HERRMANN.